(12) United States Patent
Weber et al.

(10) Patent No.: US 7,213,362 B1
(45) Date of Patent: May 8, 2007

(54) STATIONARY ARM FISHING ROD SUPPORT STAND

(76) Inventors: Mike W. Weber, 16177 W. State Highway 48, Birchwood, WI (US) 54817; Edward J. Stuart, N. 10697 County Rd. M, Colfax, WI (US) 54730

( * ) Notice: Subject to any disclaimer, the term of this patent is extended or adjusted under 35 U.S.C. 154(b) by 0 days.

(21) Appl. No.: 11/403,307

(22) Filed: Apr. 13, 2006

Related U.S. Application Data

(60) Provisional application No. 60/671,186, filed on Apr. 15, 2005.

(51) Int. Cl.
*A01K 97/10* (2006.01)

(52) U.S. Cl. .......................................... 43/21.2; 248/530

(58) Field of Classification Search ................. 43/21.2; 248/519, 523, 529, 530, 533
See application file for complete search history.

(56) References Cited

U.S. PATENT DOCUMENTS

| | | | |
|---|---|---|---|
| 1,831,190 A | | 11/1931 | Parker |
| 2,184,192 A | * | 12/1939 | McCline et al. ............. 248/530 |
| 2,311,823 A | * | 2/1943 | Gaskill ....................... 43/21.2 |
| 2,314,747 A | * | 3/1943 | White ......................... 43/21.2 |
| 2,542,253 A | * | 2/1951 | King ........................... 43/21.2 |
| 2,557,728 A | * | 6/1951 | Drumb ....................... 248/540 |
| 2,650,052 A | * | 8/1953 | Bintz ......................... 43/21.2 |
| 2,744,351 A | | 5/1956 | Smith |
| 2,804,277 A | | 8/1957 | Kinder |
| 2,811,801 A | | 11/1957 | Daniel |
| 2,851,813 A | * | 9/1958 | Gugliotta .................... 43/21.2 |
| 2,918,746 A | | 12/1959 | Hamrick |
| 2,964,868 A | | 12/1960 | Bennett |
| 3,031,048 A | * | 4/1962 | Katter ........................ 43/21.2 |
| 3,170,262 A | | 2/1965 | Hall |
| 3,470,648 A | * | 10/1969 | Bowker ....................... 43/21.2 |
| 3,516,190 A | * | 6/1970 | Cook .......................... 43/21.2 |
| 3,749,294 A | * | 7/1973 | Johnston ...................... 224/922 |
| 3,906,653 A | * | 9/1975 | Williams ..................... 43/21.2 |
| 3,973,346 A | | 8/1976 | Mason |
| 3,977,637 A | * | 8/1976 | Newton ....................... 248/538 |
| 3,992,798 A | | 11/1976 | Schmitt, Sr. |
| 4,004,365 A | | 1/1977 | Manchester |

(Continued)

FOREIGN PATENT DOCUMENTS

DE         4218277 A1 * 12/1993

(Continued)

*Primary Examiner*—Darren W. Ark
(74) *Attorney, Agent, or Firm*—Tipton L. Randall

(57) ABSTRACT

A support stand assembly for a rod and reel combination comprises a vertical support member, adapted for extending from a support surface. The support member includes a horizontal top surface and at least one vertical side surface. A T-shaped slot is positioned adjacent the at least one vertical surface of the support member and extends a selected distance into the support member from the top surface thereof. A leg of the T-shaped slot intersects the at least one vertical surface of the vertical support member. An attachment member is secured to the rod of a rod and reel combination proximal the balancing point thereof. The attachment member engages with the T-shaped slot of the support member to support the rod and reel combination in a horizontal position. The attachment member disengages from the T-shaped slot of the support member upon upward movement of the rod and reel combination.

6 Claims, 5 Drawing Sheets

U.S. PATENT DOCUMENTS

| | | |
|---|---|---|
| 4,031,651 A | 6/1977 | Titze |
| 4,043,070 A * | 8/1977 | Lamothe ............... 43/21.2 |
| 4,142,315 A | 3/1979 | Hoffman |
| 4,161,839 A * | 7/1979 | Ward ..................... 43/21.2 |
| 4,177,595 A * | 12/1979 | Chon ..................... 43/21.2 |
| 4,344,248 A | 8/1982 | Brophy, Sr. et al. |
| 4,407,089 A * | 10/1983 | Miller .................... 43/21.2 |
| 4,763,435 A * | 8/1988 | Deering ................. 43/21.2 |
| 4,837,965 A * | 6/1989 | True ........................ 43/17 |
| 4,866,873 A | 9/1989 | Van Valkenburg |
| 5,038,511 A | 8/1991 | Gessner |
| 5,119,580 A | 6/1992 | Schulte et al. |
| 5,446,989 A * | 9/1995 | Stange et al. ........... 43/21.2 |
| 5,501,028 A | 3/1996 | Hull et al. |
| 5,571,228 A * | 11/1996 | McMurtrie ............. 43/21.2 |
| 5,613,318 A | 3/1997 | Hislop |
| 5,910,004 A * | 6/1999 | Antosh ................... 43/21.2 |
| 5,934,004 A | 8/1999 | Koe |
| 6,129,251 A * | 10/2000 | Lajoie .................... 43/21.2 |
| 6,196,513 B1 | 3/2001 | Edwards et al. |
| 6,643,974 B2 * | 11/2003 | Ruiz et al. .............. 43/21.2 |
| 6,802,150 B2 | 10/2004 | Harden |
| 7,089,699 B2 * | 8/2006 | Borgeat ............ 43/18.1 CT |
| 2006/0179706 A1 * | 8/2006 | Weber et al. ........... 43/21.2 |

FOREIGN PATENT DOCUMENTS

| | | | |
|---|---|---|---|
| GB | 2341071 A | * | 3/2000 |
| JP | 7-289135 A | * | 11/1995 |
| JP | 7-298817 A | * | 11/1995 |
| JP | 8-107736 A | * | 4/1996 |
| JP | 8-298899 A | * | 11/1996 |
| JP | 10-14464 A | * | 1/1998 |
| JP | 10-28507 A | * | 2/1998 |
| JP | 10-75698 A | * | 3/1998 |
| JP | 11-103732 A | * | 4/1999 |
| JP | 2001-128604 A | * | 5/2001 |
| JP | 2002-238429 A | * | 8/2002 |
| JP | 2002-330682 A | * | 11/2002 |
| JP | 2003-235405 A | * | 8/2003 |
| JP | 2003-235425 A | * | 8/2003 |

* cited by examiner

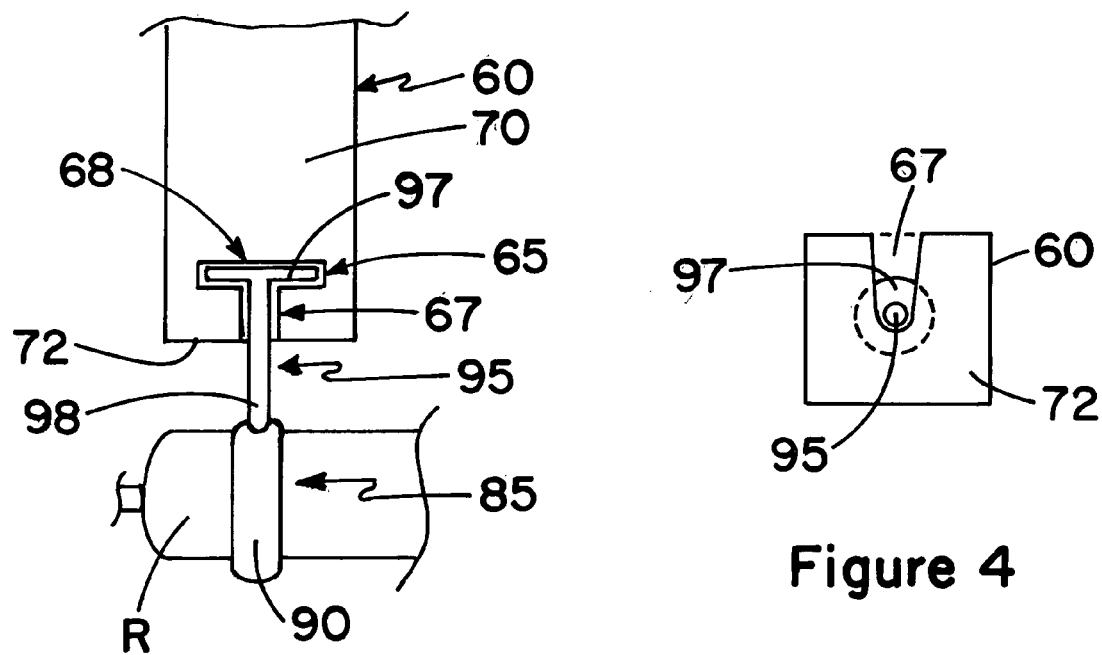
Figure 3
Figure 4
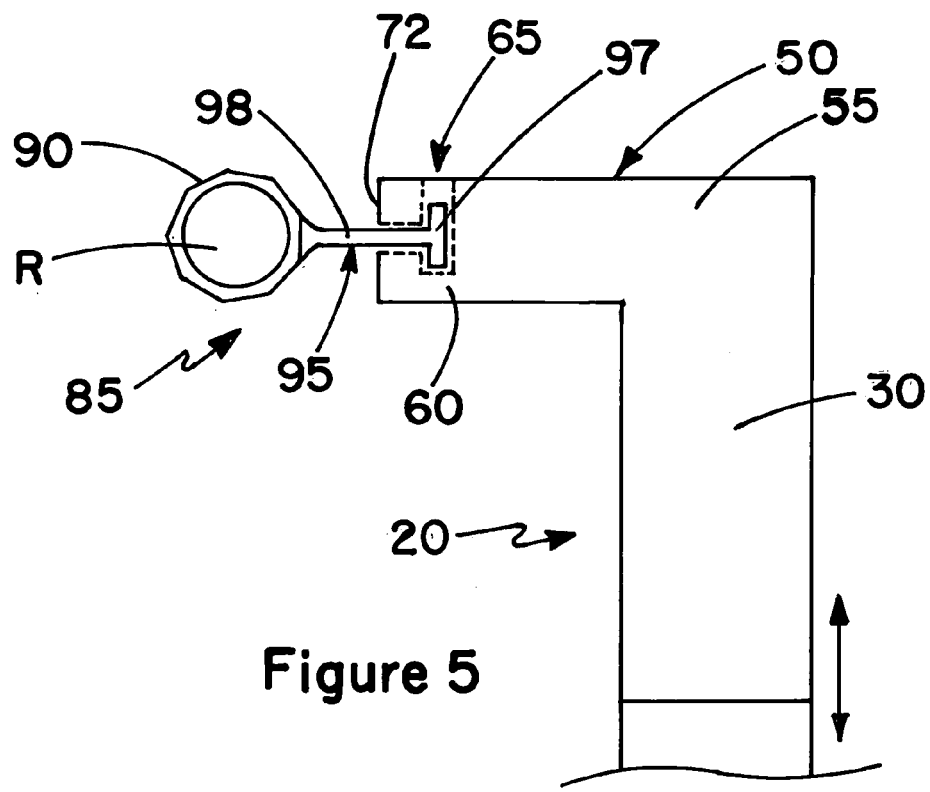
Figure 5

STATIONARY ARM FISHING ROD SUPPORT STAND

CROSS-REFERENCE TO RELATED APPLICATIONS, IF ANY

This application claims the benefit under 35 U.S.C. §119 (e) of co-pending provisional application Ser. No. 60/671,186, filed 15 Apr. 2005. Application Ser. No. 60/671,186 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for supporting a fishing rod and reel combination and, more particularly, to a quick release device for supporting a fishing rod and reel combination and, most particularly, to a portable quick release device for supporting a fishing rod and reel combination.

2. Background Information

When fishing with a rod and reel combination, the angler may wish to have a safe and efficient way to maintain his fishing line and bait in the water, yet not be required to hold the rod and reel combination in his hands. The classic example of a support for a rod and reel combination is simply a forked stick inserted into the ground to support the rod and reel combination at about a 45-degree angle. Although functional for warm weather fishing, the forked stick device is not suitable for use when ice fishing through a hole in the ice. Various devices are used to support a rod and reel combination adjacent to an ice fishing hole with the line extending down the hole and a baited hook attached to it. Patents have been granted for several of these devices, including the following: U.S. Pat. No. 1,831,190 by Parker; U.S. Pat. No. 2,744,351 by Smith; U.S. Pat. No. 2,804,277 by Kinder; U.S. Pat. No. 2,811,801 by Daniel; U.S. Pat. No. 2,918,746 by Hamrick; U.S. Pat. No. 2,964,868 by Bennett; U.S. Pat. No. 3,170,262 by Hall; U.S. Pat. No. 3,973,346 by Mason; U.S. Pat. No. 3,992,798 by Schmitt, Sr.; U.S. Pat. No. 4,004,365 by Manchester; U.S. Pat. No. 4,031,651 by Titze; U.S. Pat. No. 4,142,315 by Hoffman; U.S. Pat. No. 4,177,595 by Chon; U.S. Pat. No. 4,344,248 by Trophy, Sr., et al.; U.S. Pat. No. 4,407,089 by Miller; U.S. Pat. No. 4,866,873 by Van Valkenburg; U.S. Pat. No. 5,038,511 by Gessner; U.S. Pat. No. 5,119,580 by Schulte et al.; U.S. Pat. No. 5,501,028 by Hull et al.; U.S. Pat. No. 5,571,228 by McMurtrie; U.S. Pat. No. 5,613,318 by Hislop; U.S. Pat. No. 5,934,004 by Koe; U.S. Pat. No. 6,129,251 by Lajoie; U.S. Pat. No. 6,196,513 by Edwards et al.; U.S. Pat. No. 6,643,974 by Ruiz et al., and U.S. Pat. No. 6,802,150 by Harden. These devices have their shortcomings which impede a quick response by the angler when a fish bites the bait.

Applicants have devised a rod and reel combination support stand assembly that securely holds the rod portion of the combination in approximately a horizontal position and releases the rod from the support stand assembly instantaneously when the angler grasps the rod in response to a fish biting the bait.

SUMMARY OF THE INVENTION

The invention is directed to a support stand assembly for a rod and reel combination. The support stand assembly is adapted for receiving and securing a rod and reel combination having a balancing point. In one embodiment, the support stand assembly comprises a support member adapted for extending from a support surface, the support member including a horizontal top surface and at least one vertical side surface. A T-shaped slot is positioned adjacent the at least one vertical surface of the support member and extends a selected distance into the support member from the top surface thereof. A leg of the T-shaped slot intersects the at least one vertical surface of the vertical support member. An attachment member is adapted for securement to the rod of a rod and reel combination proximal the balancing point thereof. The attachment member is engagable with the T-shaped slot of the support member to support the rod and reel combination. The attachment member is engaged with the T-shaped slot of the support member to support the rod and reel combination in a horizontal position. The attachment member disengages from the T-shaped slot of the support member upon upward movement of the rod and reel combination and the attachment member secured thereto.

In another embodiment, the support stand assembly comprises a vertical support member adapted for extending from a support surface. A linear support arm member is rigidly secured at a first end to the vertical support member with the support arm member extending substantially horizontally in a stationary support position. The support arm member has a second end with a horizontal top surface and at least one vertical side surface. A T-shaped slot is positioned adjacent the at least one vertical surface of the support arm member's second end. The T-shaped slot extends a selected distance into the support arm member from a top surface thereof. A leg of the T-shaped slot intersects the at least one vertical surface of the support arm member's second end. An attachment member is adapted for securement to the rod of a rod and reel combination proximal the balancing point thereof. The attachment member is engagable with the T-shaped slot of the support arm member to support the rod and reel combination. The attachment member is engaged with the T-shaped slot of the stationary support arm member to support the rod and reel combination in a horizontal position. The attachment member disengages from the T-shaped slot of the support arm member upon upward movement of the rod and reel combination with the attachment member secured thereto.

In another embodiment of the invention, the support stand assembly comprises a horizontal base member, with a vertical support member extending from the base member. A linear support arm member is rigidly secured at a first end to the vertical support member, with the support arm member extending substantially horizontally in a stationary support position. The support arm member has a second end with a horizontal top surface and at least one vertical side surface. A T-shaped slot is positioned adjacent the at least one vertical surface of the support arm member's second end. The T-shaped slot extends a selected distance into the support arm member from a top surface thereof. A leg of the T-shaped slot intersects the at least one vertical surface of the support arm member's second end. An attachment member is adapted for securement to the rod of a rod and reel combination proximal the balancing point thereof. The attachment member is engagable with the T-shaped slot of the support arm member to support the rod and reel combination. The attachment member is engaged with the T-shaped slot of the support arm member to support the rod and reel combination in a horizontal position. The attachment member disengages from the T-shaped slot of the stationary support arm member upon upward movement of the rod and reel combination with the attachment member secured thereto.

BRIEF DESCRIPTION OF THE DRAWINGS

FIG. 3 is a top view of the support arm member engaged with the attachment member of the fishing rod support stand of the present invention.

FIG. 4 is an end view of the support arm member engaged with the attachment member of the fishing rod support stand of the present invention.

FIG. 5 is a sectional view of a support arm member engaged with the attachment member of the fishing rod support stand of the present invention.

DESCRIPTION OF THE EMBODIMENTS

| Nomenclature | |
|---|---|
| 10 | Fishing Rod and Reel Support Stand Assembly |
| 15 | Horizontal Base Member |
| 20 | Vertical Support Member |
| 25 | Lower Portion of Vertical Support Member |
| 27 | Pointed End of Vertical Support Member |
| 30 | Upper Portion of Vertical Support Member |
| 35 | Set Screw Member |
| 50 | Support Arm Member |
| 55 | First End of Support Arm Member |
| 60 | Second End of Support Arm Member |
| 65 | T-Shaped Slot in Support Arm Member |
| 67 | Leg of T-Shaped Slot |
| 70 | Top Surface of Support Arm Member |
| 72 | Vertical Surface of Support Arm Member |
| 75 | Bottom Surface of Support Arm Member |
| 85 | Attachment Member |
| 90 | Strap Portion of Attachment Member |
| 95 | T-Shaped Hanger Portion of Attachment Member |
| 97 | Head Section of T-Shaped Hanger Portion |
| 98 | Shank Section of T-Shaped Hanger Portion |
| 100 | Fishing Rod and Reel Support Stand Assembly |
| G | Support Surface |
| R | Fishing Rod |
| S | Fishing Reel |

Construction

The invention is a support stand assembly for a rod and reel combination, adapted for receiving and securing a rod and reel combination. The support stand assembly comprises a vertical support member, adapted for extending from a support surface. The support member includes a horizontal top surface and at least one vertical side surface. A T-shaped slot is positioned adjacent the at least one vertical surface of the support member and extends a selected distance into the support member from the top surface thereof. A leg of the T-shaped slot intersects the at least one vertical surface of the vertical support member. An attachment member is adapted for securement to the rod of a rod and reel combination proximal the balancing point thereof. The attachment member is engagable with the T-shaped slot of the support arm member to support the rod and reel combination. The attachment member, adapted for securement at the balance point of the rod and reel combination, is engaged with the T-shaped slot of the support arm member to support the rod and reel combination in a horizontal position. The attachment member disengages from the T-shaped slot of the stationary support arm member upon upward movement of the rod and reel combination, with the attachment member secured thereto.

Figure 1:
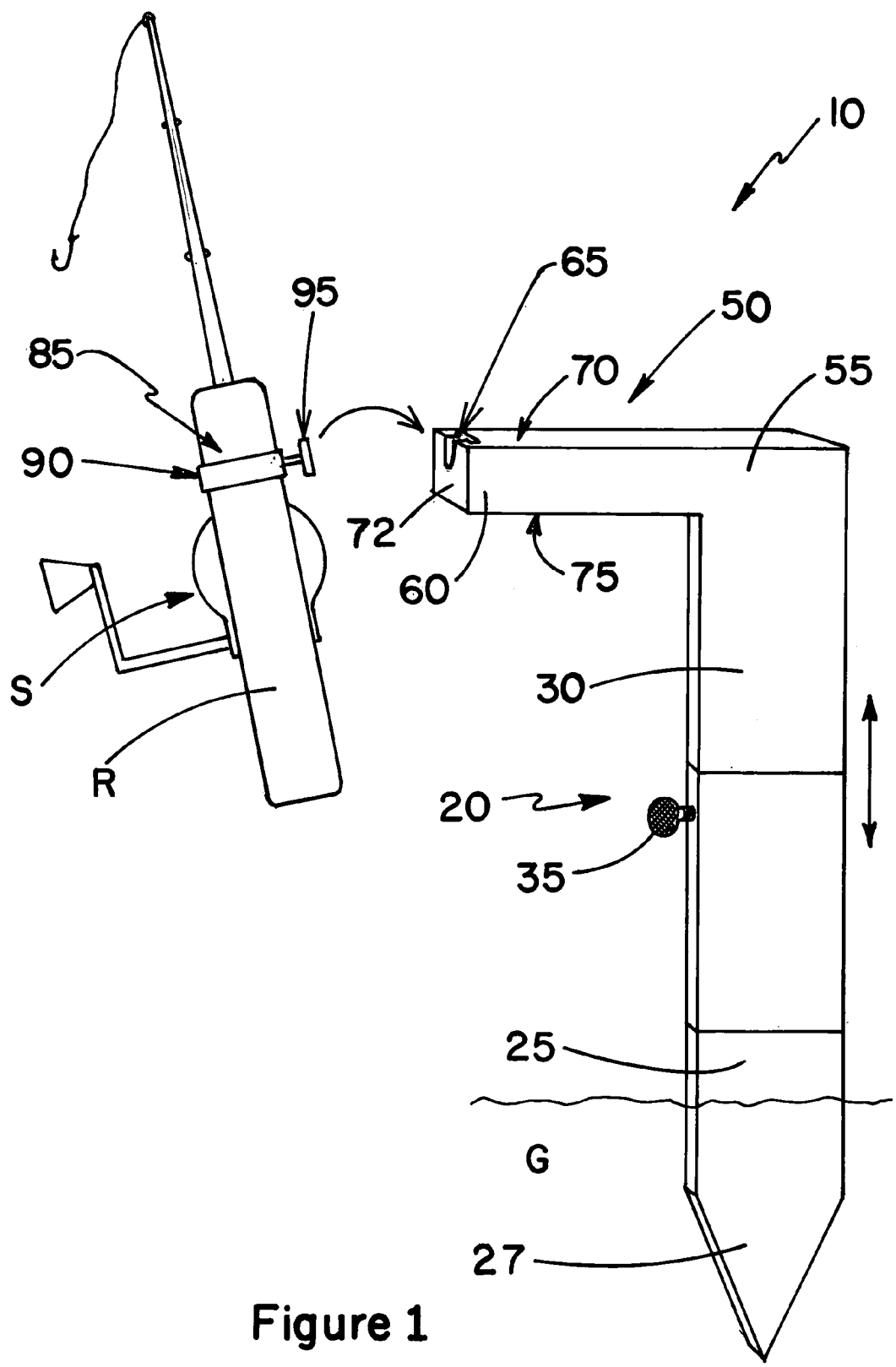
FIG. 1 is a perspective side view of one embodiment of the fishing rod support stand of the present invention.

Referring now to FIG. 1, a first embodiment of the support stand assembly 10 is illustrated. The support stand assembly 10 includes a vertical support member 20 adapted for extending from a support surface G, such as a lake or river bank. The embodiment of FIG. 1 includes a telescoping vertical support member 20, with a lower portion 25 having a pointed end 27 for penetrating the support surface G and an upper portion 30 moveable over the lower portion 25. A set screw 35, or similar device, is used to hold the upper portion 30 at a selected elevation relative to the lower portion 25. The upper portion 30 of the vertical support member 20 includes a linear support arm member 50, rigidly secured in a stationary orientation relative to the vertical support member 20. Preferably, the support arm member 50 is perpendicular to the vertical support member 20.

Figure 2:
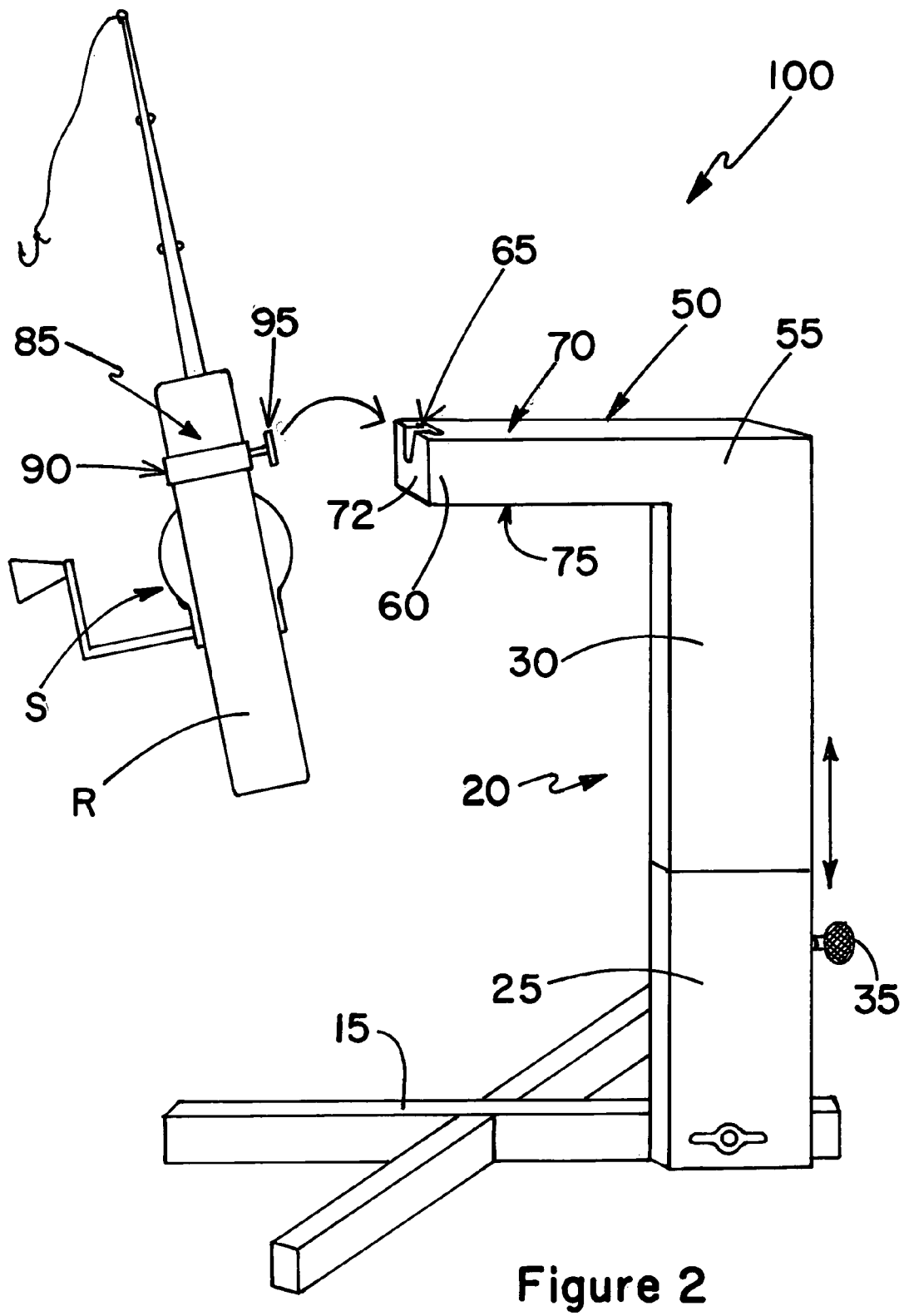
FIG. 2 is perspective side view of a further embodiment of the fishing rod support stand of the present invention.

The linear support arm member 50 is rigidly secured at a first end 55 to the vertical support member 20. In the embodiment of FIG. 1, the second end 60 of the support arm member 50 contains at least one vertical side surface 72 and includes a T-shaped slot 65, positioned close to the at least one vertical side surface 72 of the arm member's second end 60. The T-shaped slot 65 extends downwardly a selected distance from a top surface 70 of the support arm member 50. The T-shaped slot 65 is closed at the bottom, terminating short of the bottom surface 75 of the support arm member 50. A leg first 67 of the T-shaped slot 65 intersects the at least one vertical side surface 72 of the arm member's second end 60 at a first end thereof, as shown in the Figures. A second end of the first leg 67 terminating at and intersecting with a second leg 68 of the T-shaped slot 65 which extends perpendicularly with respect to the first leg 67. The second leg 68 of the T-shaped slot 65 has two opposing ends which each terminate at a location within the second end 60 of the support arm member 50 which is spaced from the intersection of the first and second legs as shown in FIG. 3 The support arm member 50 extends substantially horizontally in a stationary support position, as illustrated in FIGS. 1, 2 and 5.

Referring again to FIG. 1, an attachment member 85 is adapted for securement to the rod R of a rod and reel combination. In one embodiment, the attachment member 85 includes a strap portion 90 and a protruding T-shaped hanger portion 95, with the strap portion 90 encircling the rod R, preferably at the balance point of the rod and reel combination. The strap portion 90, preferably, includes hook and loop tape sections, allowing continuous adjustability of the strap portion 90 to accommodate fishing rods R of various diameters. Various plastic clip portions, or similar encircling fasteners, can be substituted for the strap portion 90 with equivalent results. Although the protruding T-shaped hanger portion 95 is the preferred embodiment, a ball end, or a similar attachment member to reversibly engage the T-shaped slot 65 of the support arm member 50, can be substituted for the T-shaped hanger portion 95 with equivalent results. The protruding T-shaped hanger portion 95 of the attachment member 85 is engaged with the T-shaped slot 65 of the second end 60 of the support arm member 50 to support the rod and reel combination, as indicated in FIGS. 1 and 2. The protruding T-shaped hanger portion 95 of the attachment member 85 is sized to easily slip into the T-shaped slot 65 of the second end 60 of the support arm member 50, as illustrated in FIGS. 3–5. FIG. 3 shows a top view of the T-shaped hanger portion 95 of the attachment member 85 engaged in the T-shaped slot 65 of the second end 60 of the support arm member 50. FIG. 4 provides an end view of the T-shaped hanger portion 95 of the attachment member 85 engaged in the T-shaped slot 65. FIG. 5 provides a sectional view of the T-shaped hanger portion 95 of the attachment member 85 engaged in the T-shaped slot 65.

The enlarged head section 97 of the T-shaped hanger portion 95 is preferably round and flat, similar to the head of a common nail, while the shank section 98 is cylindrical. The shank section 98 having a first end directly attached to the strap portion 90 and a second opposite end having the round, flat head 97 thereon which extends in substantially a single plane that is transverse to a longitudinal axis of the shank section 98 and has a greater diameter than the shank section 98. When positioned within the T-shaped slot 65 of the second end 60 of the support arm member 50, the shank section 98 rests on the bottom of the leg 67 of the T-shaped slot 65 that intersects the second end 60 of the support arm member 50, as illustrated in FIGS. 4 and 5. The head section 97 contacts the interior sides of the T-shaped slot 65, due to the weight of the rod and reel combination secured to the strap portion 90 of the attachment member 85, causing the T-shaped hanger portion 95 to pivot on the shank section 98 thereof. Thus, the rod and reel combination is supported in an essentially horizontal orientation by the attachment member 85, secured within the T-shaped slot 65 of the second end 60 of the support arm member 50.

In use, the first embodiment (FIG. 1) of the support stand assembly 10 is inserted into a support surface G, such as the soft bank of a river or lake. The angler casts out his line with the bait attached. With the attachment member 85 secured at the balance point of the rod and reel combination, the angler slips the protruding T-shaped hanger portion 90 of the attachment member 85 into the T-shaped slot 65 of the second end 60 of the support arm member 50 to support the rod and reel combination in a horizontal orientation. A fish biting the bait moves the rod tip downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement allows the protruding T-shaped hanger portion 95 of the attachment member 85 to readily disengage from the T-shaped slot 65 of the second end 60 of the support arm member 50. The completely disengaged rod and reel combination is illustrated in FIG. 1.

Referring now to FIG. 2, a further embodiment of the support stand assembly 100 is illustrated. This further embodiment is particularly well suited for ice fishing. The support stand assembly 100 includes a horizontal base member 15, with a vertical support member 20 extending upwardly from the base member 15. In this embodiment, the base member 15 includes two intersecting pieces of wood or similar material allowing the support stand assembly 100 to rest on a flat surface, such as the ice or the floor of an ice fishing house. The vertical support member 20 is secured to the base member 15. The further embodiment of FIG. 2 includes a telescoping vertical support member 20, with a lower portion 25 secured to the base member 15 and an upper portion 30 moveable within the lower portion 25. A set screw 35, or similar device, is used to hold the upper portion 30 at a selected elevation within the lower portion 25. The upper portion 30 of the vertical support member 20 includes a linear support arm member 50, rigidly secured in a stationary orientation relative to the vertical support member 20. Preferably, the support arm member 50 is perpendicular to the vertical support member 20.

The linear support arm member 50 is rigidly secured at a first end 55 to the vertical support member 20. In the embodiment of FIG. 2, the second end 60 of the support arm member 50 contains at least one vertical side surface 72, and includes a T-shaped slot 65 positioned close to the at least one vertical side surface 72 of the arm member's second end 60. The T-shaped slot 65 extends downwardly a selected distance from a top surface 70 of the support arm member 50. The T-shaped slot 65 is closed at the bottom, terminating short of the bottom surface 75 of the support arm member 50. A leg 67 of the T-shaped slot 65 intersects the at least one vertical side surface 72 of the arm member's second end 60, as shown in the Figures. The support arm member 50 extends, substantially, horizontally in a stationary support position, as shown in FIGS. 1 and 2.

Referring again to FIG. 2, an attachment member 85 is adapted for securement to the rod R of a rod and reel combination. In one embodiment, the attachment member 85 includes a strap portion 90 and a protruding T-shaped hanger portion 95, with the strap portion 90 encircling the rod R, preferably at the balance point of the rod and reel combination. The strap portion 90, preferably, includes hook and loop tape sections, allowing continuous adjustability of the strap portion 90 to accommodate fishing rods R of various diameters. Various plastic clip portions, or similar encircling fasteners, can be substituted for the strap portion 90 with equivalent results. Although the protruding T-shaped hanger portion 95 is the preferred embodiment, a ball end, or a similar attachment member to reversibly engage the T-shaped slot 65 of the support arm member 50, can be substituted for the T-shaped hanger portion 95 with equivalent results. The protruding T-shaped hanger portion 95 of the attachment member 85 is engaged with the T-shaped slot 65 of the second end 60 of the support arm member 50 to support the rod and reel combination, as indicated in FIGS. 1 and 2. The protruding T-shaped hanger portion 95 of the attachment member 85 is sized to easily slip into the T-shaped slot 65 of the second end 60 of the support arm member 50, as illustrated in FIGS. 3–5. FIG. 3 shows a top view of the T-shaped hanger portion 95 of the attachment member 85 engaged in the T-shaped slot 65 of the second end 60 of the support arm member 50. FIG. 4 provides an end view of the T-shaped hanger portion 95 of the attachment member 85 engaged in the T-shaped slot 65. FIG. 5 provides a sectional view of the T-shaped hanger portion 95 of the attachment member 85 engaged in the T-shaped slot 65.

The enlarged head section 97 of the T-shaped hanger portion 95 is preferably round and flat, similar to the head of a common nail, while the shank section 98 is cylindrical.

When positioned within the T-shaped slot 65 of the second end 60 of the support arm member 50, the shank section 98 rests on the bottom of the leg 67 of the T-shaped slot 65 that intersects the second end 60 of the support arm member 50, as illustrated in FIGS. 4 and 5. The head section 97 contacts the interior sides of the T-shaped slot 65 due to the weight of the rod and reel combination secured to the strap portion 90 of the attachment member 85, causing the T-shaped hanger portion 95 to pivot on the shank section 98 thereof. Thus, the rod and reel combination is supported in an essentially horizontal orientation by the attachment member 85 secured within the T-shaped slot 65 of the second end 60 of the support arm member 50.

This further embodiment (FIG. 2) of the support stand assembly 100 is used to support a rod and reel combination for ice fishing. The fishing line that passes through the eye at the end of the rod R and is positioned through a hole in the ice, with the rod and reel combination supported in an essentially horizontal position, and the support member 15 resting on the ice or floor of an ice fishing house. With the attachment member 85 secured at the balance point of the rod and reel combination, the angler slips the protruding T-shaped hanger portion 95 of the attachment member 85 into the T-shaped slot 65 of the second end 60 of the support arm member 50 to support the rod and reel combination in a horizontal orientation. When a fish bites the bait, the rod tip moves downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement allows the protruding T-shaped hanger portion 95 of the attachment member 85 to readily disengage from the T-shaped slot 65 of the second end 60 of the support arm member 50. The completely disengaged rod and reel combination is illustrated in FIG. 2.

Figure 6:
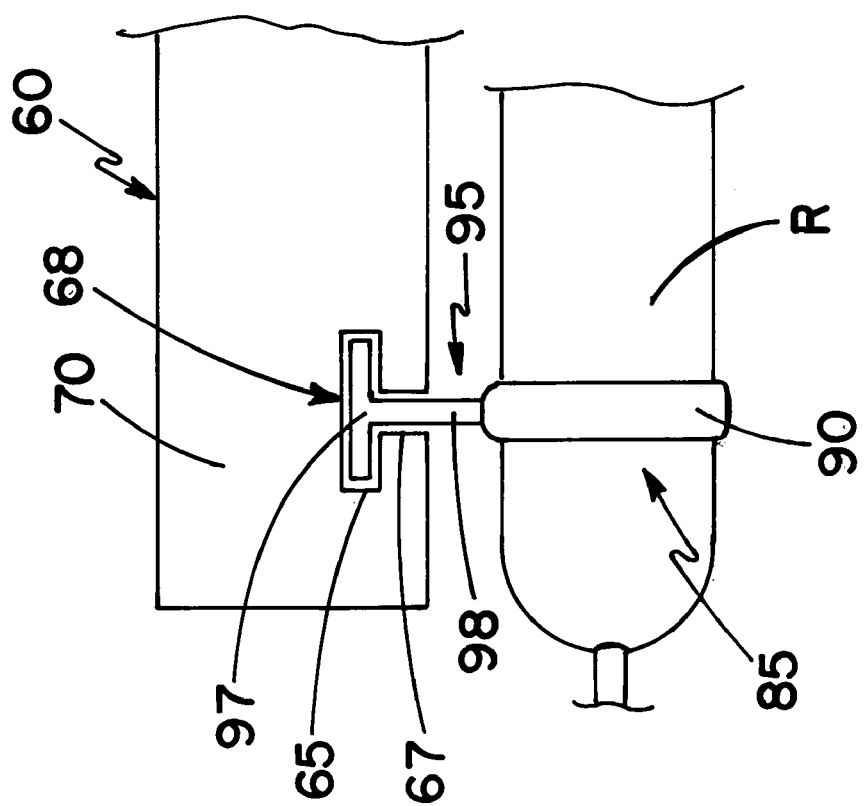
FIG. 6 is a top view of the support arm member engaged with the attachment member of the fishing rod support stand of the present invention.

Referring now to FIG. 6, an alternative placement of the T-shaped slot 65 of the second end 60 of the support arm member 50 is illustrated. Rather than located at the extreme second end 60 of the support arm member 50, with the rod and reel combination mounted perpendicularly to the support are member 50, the T-shaped slot 65 is located at one side of the second end 60 of the support arm member 50, with the rod and reel combination mounted parallel to the support arm member 50.

Figure 7:
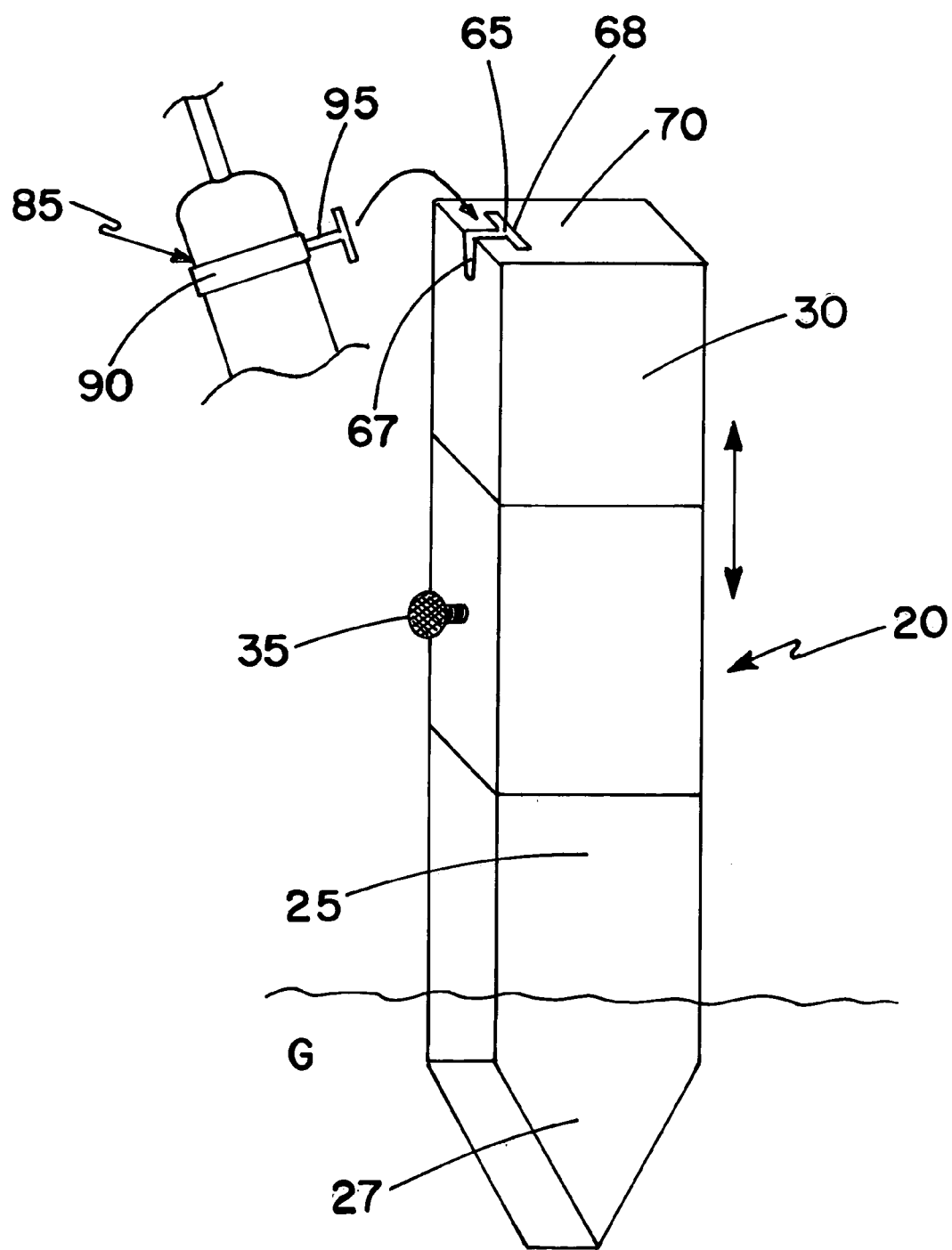
FIG. 7 is a perspective side view of yet another embodiment of the fishing rod support stand of the present invention.

Referring now to FIG. 7, yet another embodiment of the support stand assembly 10 is illustrated. The support stand assembly 10 includes a vertical support member 20 adapted for extending from a support surface G, such as a lake or river bank. The embodiment of FIG. 7 includes a telescoping vertical support member 20, with a lower portion 25 having a pointed end 27 for penetrating the support surface G and an upper portion 30 moveable over the lower portion 25. A set screw 35, or similar device, is used to hold the upper portion 30 at a selected elevation relative to the lower portion 25. The upper portion 30 of the support member 20 includes a horizontal top surface 70 and at least one vertical side surface 72. A T-shaped slot 65 is positioned adjacent the at least one vertical surface 72 of the support member 20 and extends a selected distance into the support member 20 from the top surface 70 thereof. A leg first 67 of the T-shaped slot 65 intersects the at least one vertical surface 72 of the vertical support member 20 at a first end thereof. A second end of the first leg 67 terminating at and intersecting with a second leg 68 of the T-shaped slot 65 which extends perpendicularly with respect to the first leg 67. The second leg 68 of the T-shaped slot 65 has two opposing ends which each terminate at a location within the vertical support member 20 which is spaced from the intersection of the first and second legs as shown in FIG. 3

An attachment member 85 is adapted for securement to the rod R of a rod and reel combination. In one embodiment, the attachment member 85 includes a strap portion 90 and a protruding T-shaped hanger portion 95, with the strap portion 90 encircling the rod R, preferably at the balance point of the rod and reel combination. The strap portion 90, preferably, includes hook and loop tape sections allowing continuous adjustability of the strap portion 90 to accommodate fishing rods R of various diameters. Various plastic clip portions, or similar encircling fasteners, can be substituted for the strap portion 90 with equivalent results. Although the protruding T-shaped hanger portion 95 is the preferred embodiment, a ball end or a similar attachment member to reversibly engage the T-shaped slot 65 of the support arm member 50, can be substituted for the T-shaped hanger portion 95 with equivalent results. The protruding T-shaped hanger portion 95 of the attachment member 85 is engaged with the T-shaped slot 65 of the second end 60 of the support arm member 50 to support the rod and reel combination, as indicated in FIG. 7. The protruding T-shaped hanger portion 95 of the attachment member 85 is sized to easily slip into the T-shaped slot 65 of the second end 60 of the support arm member 50, as illustrated in FIGS. 3–5. FIG. 3 shows a top view of the T-shaped hanger portion 95 of the attachment member 85 engaged in the T-shaped slot 65 of the second end 60 of the support arm member 50. FIG. 4 provides an end view of the T-shaped hanger portion 95 of the attachment member 85 engaged in the T-shaped slot 65. FIG. 5 provides a sectional view of the T-shaped hanger portion 95 of the attachment member 85 engaged in the T-shaped slot 65.

The enlarged head section 97 of the T-shaped hanger portion 95 is preferably round and flat, similar to the head of a common nail, while the shank section 98 is cylindrical. The shank section 98 having a first end directly attached to the strap portion 90 and a second opposite end having the round, flat head 97 thereon which extends in substantially a single plane that is transverse to a longitudinal axis of the shank section 98 and has a greater diameter than the shank section 98. When positioned within the T-shaped slot 65 of the second end 60 of the support arm member 50, the shank section 98 rests on the bottom of the leg 67 of the T-shaped slot 65 that intersects the second end 60 of the support arm member 50, as illustrated in FIGS. 4 and 5. The head section 97 contacts the interior sides of the T-shaped slot 65, due to weight of the rod and reel combination secured to the strap portion 90 of the attachment member 85, causing the T-shaped hanger portion 95 to pivot on the shank section 98 thereof. Thus, the rod and reel combination is supported in an essentially horizontal orientation by the attachment member 85, secured within the T-shaped slot 65 of the second end 60 of the support arm member 50.

In use, this embodiment (FIG. 7) of the support stand assembly 10 is inserted into a support surface G, such as the soft bank of a river or lake. The angler casts out his line with the bait attached. With the attachment member 85 secured at the balance point of the rod and reel combination, the angler slips the protruding T-shaped hanger portion 90 of the attachment member 85 into the T-shaped slot 65 of the second end 60 of the support arm member 50 to support the rod and reel combination in a horizontal orientation. When a fish bites the bait, the rod tip moves downwardly, and the angler can grasp the rod R and set the hook. This is the situation in which the support stand assembly 10 of the present invention provides an advantage over other similar devices.

As the angler grasps the rod R and lifts the rod and reel combination to set the hook, the upward movement allows the protruding T-shaped hanger portion 95 of the attachment member 85 to readily disengage from the T-shaped slot 65 of the second end 60 of the support arm member 50. The completely disengaged rod and reel combination is illustrated in FIG. 7.

All embodiments of the support stand assembly 10 or 100 can accommodate either right-handed or left-handed spinning reels of a rod and reel combination. The angler can position the support stand assembly 10 or 100 so that the reel handle is opposite the vertical support member 20 of any of the support stand assemblies 10 or 100 described above. Alternatively, the attachment member 85 is secured to the rod R such that the T-shaped hanger portion 95 is oriented away from the reel handle.

While the invention has been particularly shown and described with reference to preferred embodiments thereof, it will be understood by those skilled in the art that various changes in form and details may be made therein without departing from the spirit and scope of the invention.

We claim:

1. A rod and reel combination support stand assembly adapted for receiving and securing a rod and reel combination having a balancing point, the support stand assembly comprising:

a support member adapted for extending from a support surface, the support member including a horizontal top surface and at least one vertical side surface;

a T-shaped slot positioned adjacent the at least one vertical surface of the support member and extending a selected distance into the support member from the top surface thereof, a first leg of the T-shaped slot intersecting the at least one vertical surface of the vertical support member at a first end thereof, a second end of the first leg of the T-shaped slot terminating at and intersecting with a second leg of the T-shaped slot which extends perpendicularly with respect to the first leg, the second leg having two opposing ends which each terminate at a location within the support member which is spaced from the intersection of the first and second legs; and an attachment member adapted for securement to the rod of a rod and reel combination proximal the balancing point thereof, the attachment member including a strap portion adapted for encircling the fishing rod and a T-shaped hanger portion including a shank section having one end directly secured to the strap portion and an other end opposite the one end and the strap portion, the other end of the shank section having a round, flat head both extending in substantially a single plane that is transverse to a longitudinal axis of the shank section and having a greater diameter than the shank section, the round, flat head of the attachment member engagable with the T-shaped slot in the support member with the shank section positioned within the first leg of the T-shaped slot intersecting the at least one vertical surface of the vertical support member to support the rod and reel combination;

whereby the attachment member, adapted for securement at the balancing point of the rod and reel combination, is engaged with the T-shaped slot of the support member to support the rod and reel combination in a horizontal position, the attachment member disengaging from the T-shaped slot of the support member upon upward movement of the rod and reel combination and the attachment member secured thereto.

2. The rod and reel combination support stand assembly adapted for receiving and securing a rod and reel combination according to claim 1, wherein the support member is vertically oriented.

3. The rod and reel combination support stand assembly adapted for receiving and securing a rod and reel combination according to claim 1, wherein the support member is horizontally oriented.

4. The rod and reel combination support stand assembly adapted for receiving and securing a rod and reel combination according to claim 1, wherein the support member includes a pointed end adapted for insertion into a support surface.

5. The rod and reel combination support stand assembly adapted for receiving and securing a rod and reel combination according to claim 1, wherein the support member is telescopically adjustable.

6. The rod and reel combination support stand assembly adapted for receiving and securing a rod and reel combination according to claim 1, wherein the strap portion includes hook and loop tape sections providing continuous adjustability in strap length.

* * * * *